US009185271B2

(12) United States Patent
Kawakami et al.

(10) Patent No.: US 9,185,271 B2
(45) Date of Patent: Nov. 10, 2015

(54) IMAGING DEVICE DETECTING MOTION VECTOR

(75) Inventors: Masashi Kawakami, Yokohama (JP); Yushi Kaneko, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/358,349

(22) Filed: Jan. 25, 2012

(65) Prior Publication Data
US 2012/0194685 A1 Aug. 2, 2012

(30) Foreign Application Priority Data

Jan. 31, 2011 (JP) ................................ 2011-018828

(51) Int. Cl.
H04N 5/228 (2006.01)
H04N 5/262 (2006.01)
H04N 5/217 (2011.01)
H04N 5/357 (2011.01)
H04N 19/513 (2014.01)
H04N 19/53 (2014.01)
H04N 19/57 (2014.01)
H04N 19/85 (2014.01)

(52) U.S. Cl.
CPC ............. *H04N 5/217* (2013.01); *H04N 5/3572* (2013.01); *H04N 19/513* (2014.11); *H04N 19/53* (2014.11); *H04N 19/57* (2014.11); *H04N 19/85* (2014.11)

(58) Field of Classification Search
CPC .......... H04N 5/23248; H04N 5/23254; H04N 5/23212; H04N 5/23216; H04N 5/23264
USPC ................. 348/208.99, 208.1, 208.4, 240.99, 348/240.2, 240.3, 335, 352; 375/240.16; 396/53
See application file for complete search history.

(56) References Cited

U.S. PATENT DOCUMENTS

| 6,088,535 | A  | * | 7/2000 | Katano et al. ................... 396/72 |
| 6,191,808 | B1 | * | 2/2001 | Katayama et al. .............. 348/39 |
| 8,199,202 | B2 | * | 6/2012 | Watanabe ................ 348/208.13 |
| 8,248,509 | B2 |   | 8/2012 | Shirai |
| 2003/0118104 | A1 | * | 6/2003 | Zaccarin .................. 375/240.16 |
| 2007/0002145 | A1 |   | 1/2007 | Furukawa |
| 2007/0188619 | A1 | * | 8/2007 | Kurata ..................... 348/208.99 |
| 2007/0216781 | A1 | * | 9/2007 | Miyanohara ............. 348/231.99 |
| 2008/0019615 | A1 | * | 1/2008 | Schnee et al. ................. 382/313 |
| 2008/0212675 | A1 | * | 9/2008 | Ohgose et al. ........... 375/240.16 |
| 2008/0246848 | A1 | * | 10/2008 | Tsubaki et al. ............ 348/208.4 |

(Continued)

FOREIGN PATENT DOCUMENTS

JP 2007-013430 A 1/2007
JP 2007-129587 A 5/2007

(Continued)

*Primary Examiner* — Sinh Tran
*Assistant Examiner* — Xi Wang
(74) *Attorney, Agent, or Firm* — Canon USA, Inc., IP Division

(57) ABSTRACT

An imaging device includes a first detection unit, a vector correction unit, and a second detection unit. The first detection unit is configured to detect a motion vector based on reference image data and input image data after aberration of a lens is corrected. The vector correction unit is configured to correct an error component included in the motion vector detected by the first detection unit according to an aberration characteristic of the lens. The error component is produced by aberration correction. The second detection unit is configured to set a search area of the motion vector based on the motion vector corrected by the vector correction unit and detect the motion vector in the search area.

19 Claims, 16 Drawing Sheets

(56) References Cited

U.S. PATENT DOCUMENTS

| | | |
|---|---|---|
| 2010/0026875 A1 | 2/2010 | Shirai |
| 2010/0231731 A1* | 9/2010 | Motomura et al. ........ 348/208.4 |
| 2010/0295956 A1* | 11/2010 | Goto .......................... 348/208.6 |
| 2011/0043667 A1* | 2/2011 | Kotani ......................... 348/241 |
| 2012/0154544 A1* | 6/2012 | Sato ............................... 348/47 |

FOREIGN PATENT DOCUMENTS

| | | |
|---|---|---|
| JP | 2008-193458 A | 8/2008 |
| JP | 2009-055410 A | 3/2009 |
| JP | 2010-041244 A | 2/2010 |

* cited by examiner

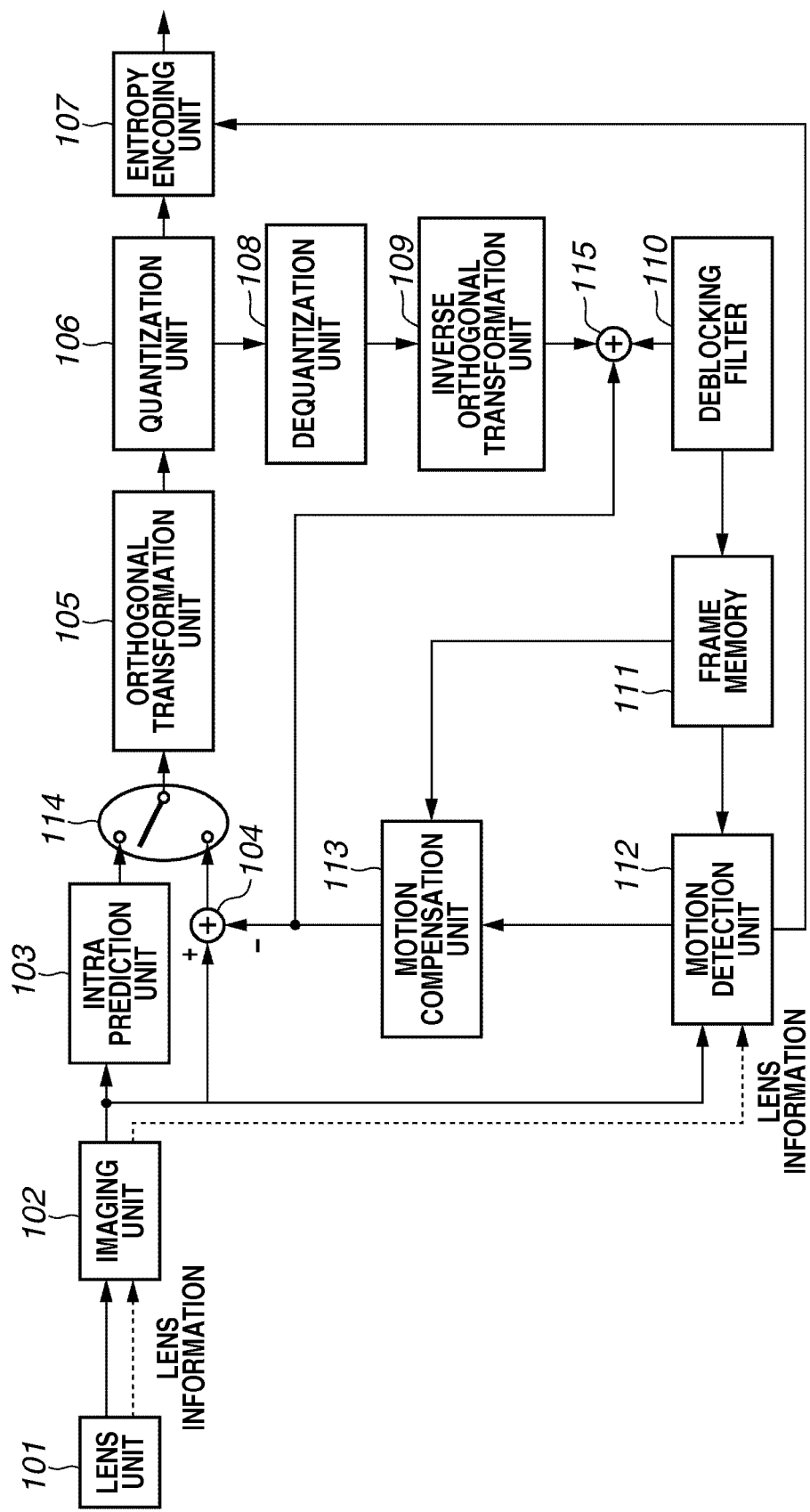

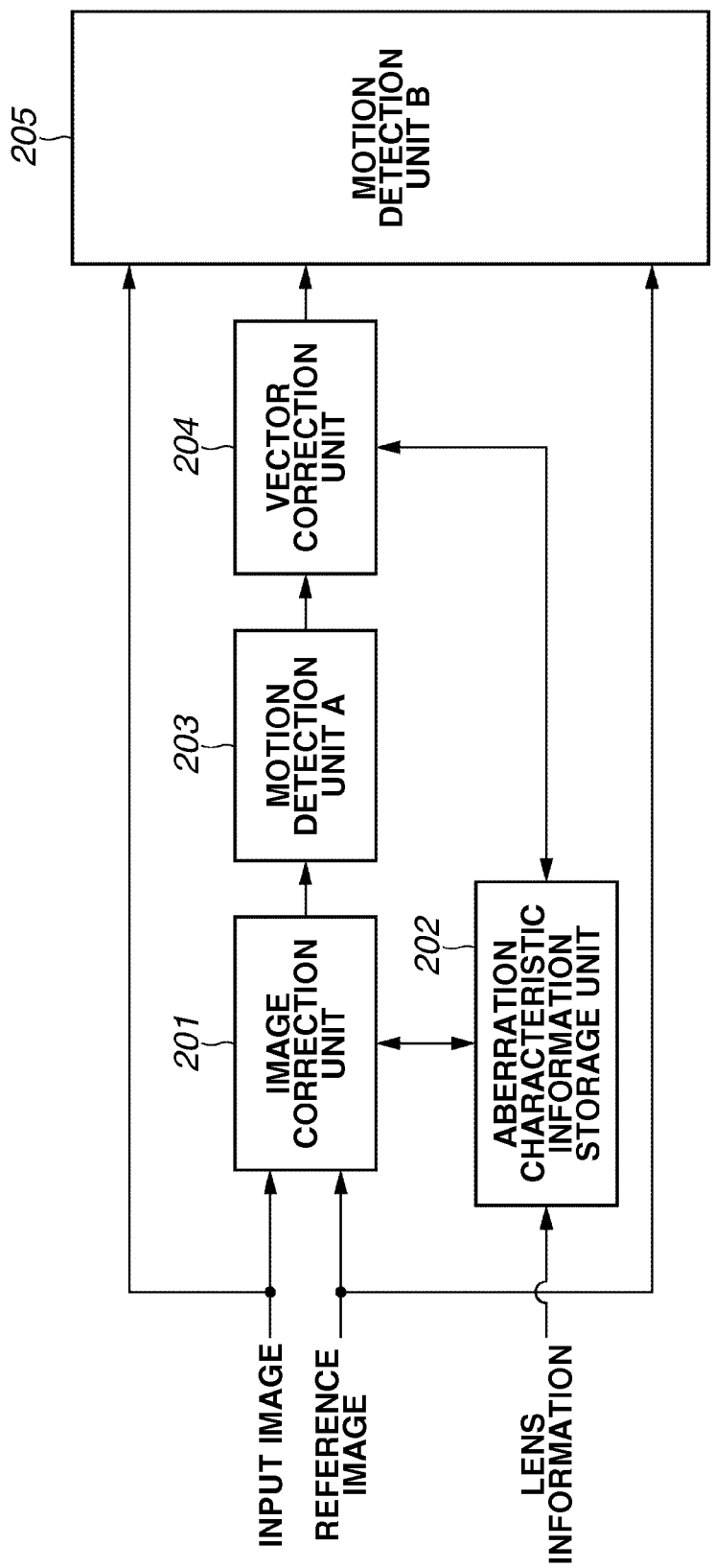

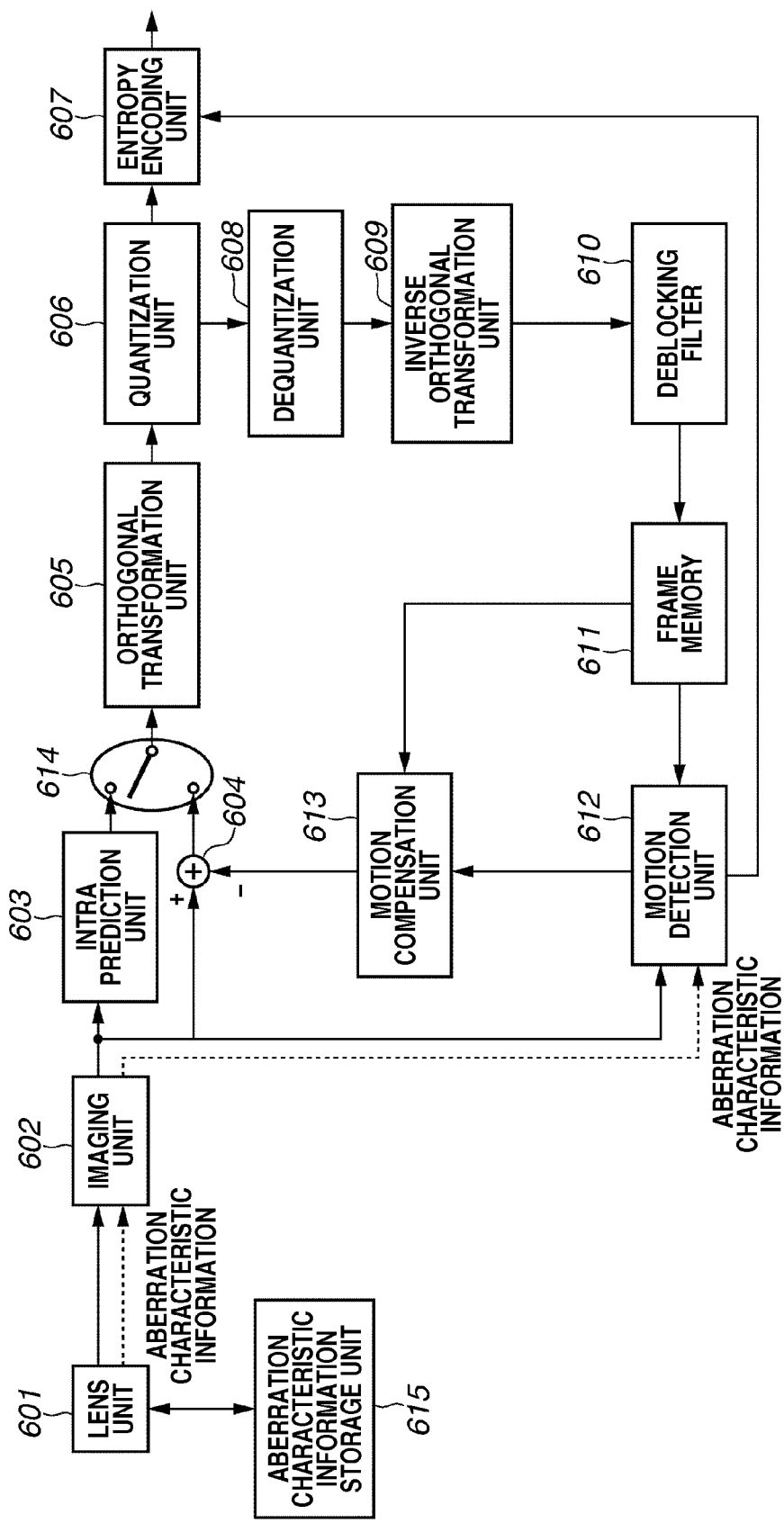

| AREA | SEARCH RANGE | |
|---|---|---|
| | X | Y |
| a | 31 | 26 |
| b | 23 | 17 |
| c | 15 | 12 |
| d | 10 | 7 |
| e | 7 | 5 |
| f | 5 | 3 |

IMAGING DEVICE DETECTING MOTION VECTOR

BACKGROUND OF THE INVENTION

1. Field of the Invention

The present invention relates to a technique for detecting a motion vector from image data generated based on a subject image input through a lens having aberration such as distortion in an imaging device.

2. Description of the Related Art

A digital camcorder and a digital still camera photograph a subject, and encode and store a captured moving image. Examples of the digital camcorder and the digital still camera include an interchange lens type (for example, a digital single-lens reflex camera) having a detachable lens. The lens can be replaced by various lenses such as a telephoto lens and a wide-angle lens according to a photographic scene. Examples of the lens include a super-wide-angle lens referred to as a fisheye lens. The super-wide-angle lens has great distortion. An image captured by the super-wide-angle lens is magnified toward a center of a frame, and is reduced toward a periphery of the frame. On the other hand, there is a known technique (Japanese Patent Application Laid-Open No. 2008-193458) for correcting distortion of a lens in an imaging device having an attached super-wide-angle lens.

A technique for compression-encoding moving image data and storing the compression-encoded moving image data in a storage medium is generally used in a device taking a moving image to acquire an input signal. A high efficiency encoding system such as moving picture experts group phase 2 (MPEG-2) or H.264 has been known as a system for encoding the moving image data. The high efficiency encoding system employs a method referred to as inter-frame prediction (inter prediction) to obtain high compression efficiency. The method generates prediction image data based on frames at different times, and encodes difference image data between input image data and the prediction image data. A technique indispensable in the inter-frame prediction is motion compensation. This technique is used to detect a motion vector and generate the prediction image data from reference image data and the motion vector, to further reduce an amount of information of the difference image data.

Here, when the taken image data is greatly distorted, the motion compensation of the conventional technique causes the following problem. For example, a subject image is distorted by distortion of a lens, and thereby a shape of a subject represented by input image data becomes different from that of a subject represented by reference image data. This disadvantageously causes reduction in encoding efficiency when motion compensation is performed.

SUMMARY OF THE INVENTION

The present invention is directed to a technique for appropriately setting a search area when detecting a motion vector from image data generated based on a subject image input through a lens having aberration such as distortion, and improving detection efficiency of the motion vector.

According to an aspect of the present invention, an imaging device includes an imaging unit configured to generate image data from a subject image incident through a lens, an image correction unit configured to correct aberration included in reference image data corresponding to image data generated at a first time point by the imaging unit and aberration included in image data generated at a second time point after the first time point by the imaging unit, according to an aberration characteristic of the lens, respectively, a first detection unit configured to detect a motion vector based on the reference image data and the image data each aberration corrected by the image correction unit, a vector correction unit configured to correct an error component included in the motion vector detected by the first detection unit according to the aberration characteristic of the lens, the error component produced by aberration correction by the image correction unit, and a second detection unit configured to set a search area of the motion vector based on the motion vector corrected by the vector correction unit and detect the motion vector in the search area.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the invention.

FIG. 1 illustrates a constitution of an imaging device according to a first exemplary embodiment of the present invention.

FIG. 2 illustrates a constitution of a motion detection unit in detail.

FIG. 6 illustrates a constitution of an imaging device according to a second exemplary embodiment of the present invention.

FIG. 12 describes an example of motion search area data in a fisheye lens.

FIG. 13 illustrates a specific example of a motion search area.

DESCRIPTION OF THE EMBODIMENTS

Figure 3B:
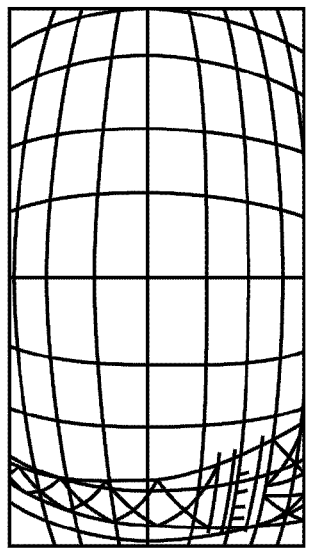
FIGS. 3A, 3B, 3C, and 3D describe an image correction unit.

Various exemplary embodiments, features, and aspects of the invention will be described in detail below with reference to the drawings.

First, a first exemplary embodiment of the present invention will be described. FIG. 1 illustrates a constitution of an imaging device according to a first exemplary embodiment of the present invention. In particular, FIG. 1 illustrates components related to encoding processing. The exemplary embodiment to be described later includes a constitution employing an encoding system of H.264 as an example.

As illustrated in FIG. 1, an imaging device according to the exemplary embodiment includes a lens unit 101, an imaging unit 102, an intra prediction unit 103, an adder 104, an orthogonal transformation unit 105, a quantization unit 106, an entropy encoding unit 107, an dequantization unit 108, an inverse orthogonal transformation unit 109, a deblocking filter 110, a frame memory 111, a motion detection unit 112, a motion compensation unit 113, a switch 114, and an adder 115, as the components related to the encoding processing.

Here, operations of the components during the encoding processing will be described. The lens unit 101 includes a lens and a lens actuator configured to control the lens, and the like. The lens unit 101 forms an incident subject image on the imaging unit 102. The imaging unit 102 includes a sensor, a noise removal circuit, and an analog/digital (A/D) conversion unit and the like. The imaging unit 102 converts the subject image obtained through the lens unit 101 into an electric signal. Furthermore, the imaging unit 102 subjects the electric signal to A/D conversion to convert an analog signal into image data of a digital signal. The imaging unit 102 outputs the digitalized image data (hereinafter, referred to as input image data) to the intra prediction unit 103, the adder 104, and the motion detection unit 112.

The Intra prediction unit 103 generates prediction image data using the input image data in the same frame. The Intra prediction unit 103 generates difference image data which is a difference between the generated prediction image data and the input image data from the imaging unit 102, and outputs the difference image data to the switch 114. The adder 104 subtracts prediction image data generated by the motion compensation unit 113 to be described later from the input image data, and generates difference image data. The difference image data is output to the switch 114.

The switch 114 selects the difference image data from the intra prediction unit 103 in the case of intra prediction. The switch 114 selects the difference image data from the adder 104 in the case of inter prediction, and outputs the difference image data to the orthogonal transformation unit 105.

The orthogonal transformation unit 105 subjects the difference image data output from the switch 114 to orthogonal transformation processing. Subsequently, the quantization unit 106 quantizes the orthogonally transformed difference image data. The image data quantized by the quantization unit 106 is output to the entropy encoding unit 107.

The entropy encoding unit 107, into which a motion vector generated by the motion detection unit 112 to be described later and data such as a quantization parameter used for other quantization processing are input in addition to the quantized image data, generates a stream according to syntax. The generated stream is stored in a storage medium and the like which is not shown. A code amount of the image data is reduced (compressed) by the above-mentioned processing.

The quantized image data is input into the dequantization unit 108, to be subjected to inverse quantization processing. The inverse orthogonal transformation unit 109 subjects the inversely quantized image data to inverse orthogonal transformation processing to restore the difference image data. The difference image data is output to the adder 115.

The adder 115 adds the prediction image data output from the motion compensation unit 113 and the difference image data output from the dequantization unit 108 to generate reference image data. The adder 115 outputs the reference image data to the deblocking filter 110.

The deblocking filter 110 subjects the reference image data to deblocking processing to remove block noise from the reference image data. The deblocking filter 110 inputs the reference image data into the frame memory 111. In the case of the intra prediction, the reference image data is input into the frame memory 111 without being subjected to the deblocking processing.

The motion detection unit 112 detects a motion vector using the input image data input from the imaging unit 102 and the reference image data read from the frame memory 111 . Here, a time point at which the input image data is captured is different from a time point at which the reference image data is captured. The input image data is captured after the reference image data is captured. The detected motion vector is output to the motion compensation unit 113 and the entropy encoding unit 107.

The motion compensation unit 113 generates the prediction image data used in the inter prediction using the motion vector, and the reference image data read from the frame memory 111. The prediction image data generated by the motion compensation unit 113 is output to the adder 104. The adder 104 generates the difference image data. These are the operations of the components during the encoding processing.

Next, the operations of the components during aberration correction will be described. The lens unit 101 outputs lens information held in the lens unit 101 besides the subject image to the imaging unit 102. The lens information is information indicating a type of a lens and a focal length of the lens and the like, for example.

The imaging unit 102, into which the lens information is input, outputs the lens information to the motion detection unit 112. The motion detection unit 112 holds a plurality of aberration characteristic information used for aberration correction. In the subsequent description, distortion will be described as an example on behalf of various kinds of aberration. That is, the aberration characteristic information means characteristic information of the distortion. Herein, the aberration characteristic information is a data group used when the distortion is corrected. Specific examples of the aberration characteristic information include a table storing a position (x, y) of image data after the distortion is corrected with the position of the image data as an index.

FIG. 2 illustrates a constitution of the motion detection unit 112 in detail. Hereinafter, an operation of the motion detection unit 112 when the motion vector is detected will be described with reference to FIG. 2.

The motion detection unit 112 includes an image correction unit 201, an aberration characteristic information storage unit 202, a motion detection unit A 203, a vector correction unit 204, and a motion detection unit B 205. The motion detection unit 112 hierarchically searches the motion vector to reduce a required amount of data while searching the motion vector in a large search area for an algorithm for detecting the motion vector. The motion detection unit 112 reduces the input image data and the reference image data at the same reduction rate, and roughly searches the motion vector using the reduced image data. Then, the motion detection unit 112 further searches the motion vector in a small area positioned at a periphery of the large search area using image data having a changed reduction rate. The motion detection unit 112 repeatedly searches the motion vector until the motion vector having desired precision is obtained. In the exemplary embodiment, the motion detection unit A 203 roughly searches the motion vector. The motion detection unit B 205 detects the motion vector showing higher precision. More specifically, in the exemplary embodiment, the two-layer search of the motion vector is performed. The motion detection unit A 203 is an application example of a first detection unit. The motion detection unit B 205 is an application example of a second detection unit.

The image correction unit 201, which receives the input image data from the imaging unit 102 and the reference image data from the frame memory 111, subjects each image data to distortion correction. The image correction unit 201 is connected to the aberration characteristic information storage unit 202. The aberration characteristic information storage unit 202 previously holds the aberration characteristic information indexing by the type of the lens and the focal length of the lens. When the image correction unit 201 performs the distortion correction on the image data, the aberration characteristic information storage unit 202 returns the aberration characteristic information according to the type of the lens and the focal length of the lens to the image correction unit 201. The aberration characteristic information storage unit 202 further holds the aberration characteristic information indexing by the position of the image data. Therefore, when a position of the uncorrected image data is input into the aberration characteristic information storage unit 202, a position of the corrected image data according to the type of the lens and the focal length of the lens is returned to the image correction unit 201. The image correction unit 201 reduces the input image data and the reference image data subjected to the distortion correction, and outputs the input image data and the reference image data to the motion detection unit A 203.

Figure 3D:
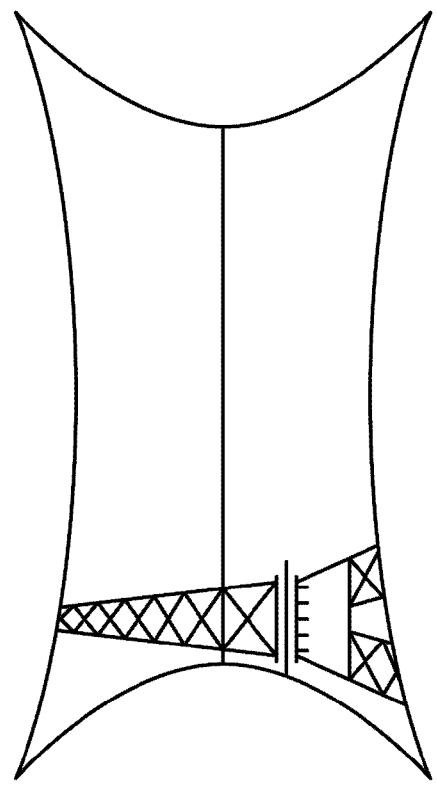
Figure 3A:
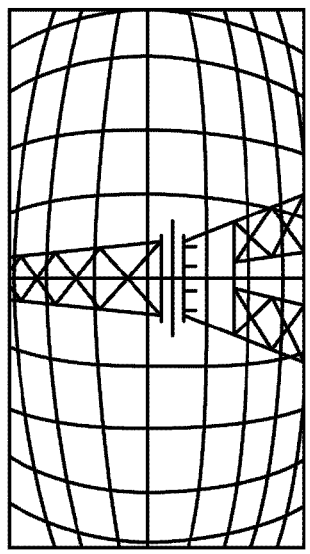
Figure 3C:
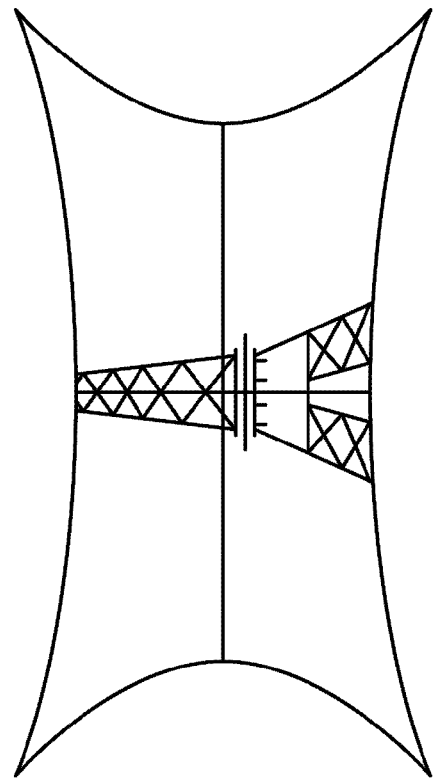

Herein, the image correction unit 201 will be described in more detail using FIGS. 3A-D. FIG. 3A illustrates the input image data, and FIG. 3B illustrates the reference image data. A shape of each image data is distorted by the aberration. Therefore, the shapes of the subjects are distorted even when a subject of the input image data is the same as a subject of the reference image data if positions of image data of the subjects are different, in the case of detecting the motion vector. Accordingly, it is difficult to detect the motion vector. FIG. 3C illustrates input image data after the input image data of FIG. 3A is subjected to the distortion correction. FIG. 3D illustrates reference image data after the reference image data of FIG. 3B is subjected to the distortion correction. Because the subject has no distortion in the input image data and the reference image data after the distortion correction, detection precision of the motion vector is improved. The image correction unit 201 performs aberration correction (distortion correction) to obtain the image data having the subject having no distortion as illustrated in FIGS. 3C and 3D.

The description will be returned to FIG. 2. The motion detection unit A 203 is configured to roughly search the motion vector as described above. The motion detection unit A 203, which receives the input image data and the reference image data subjected to the distortion correction and reduction, searches and detects the motion vector. Because the input image data and the reference image data used at this time are subjected to the distortion correction, the motion vector can be detected in a state where no distortion is caused by the aberration of the lens. More specifically, search precision of the motion vector can be improved by correcting the subject image distorted by the aberration of the lens to an original shape (shape having no distortion). The motion detection unit A 203 outputs the detected motion vector to the vector correction unit 204.

Figure 4:
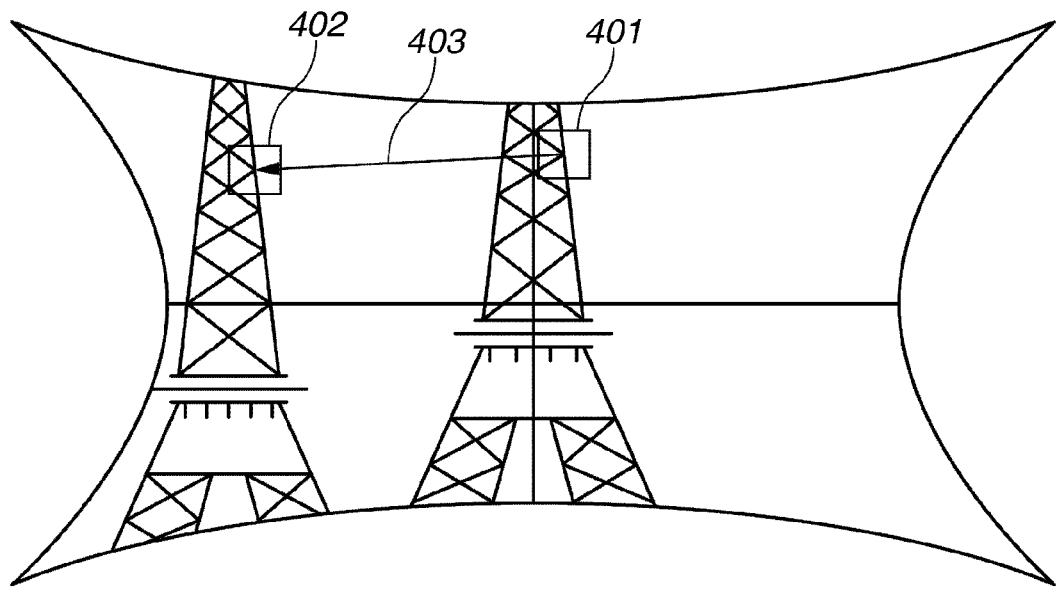
FIG. 4 describes a motion detection unit A.

Herein, the motion detection unit A 203 will be described in more detail using FIG. 4. FIG. 4 is an image obtained by superimposing the input image data and the reference image data having the corrected distortion. A macro block 401 is encoded in the input image data. A block 402 is the same as a macro block to be encoded in the reference image data. A motion vector 403 is detected as a result of searching the motion vector by the motion detection unit A 203. As illustrated in FIG. 4, the motion detection unit A 203 detects the motion vector using the image data having the corrected distortion, and outputs the motion vector to the vector correction unit 204.

The description will be returned to FIG. 2 again. Because the motion vector input into the vector correction unit 204 is detected from the image data having the corrected distortion, the motion vector is different from a motion vector stored in the storage medium after encoding the image data having distortion. Then, the vector correction unit 204 corrects an error component of the motion vector generated by the distortion correction of each image so that the motion vector generated by the motion detection unit A 203 can correspond to the motion vector in the image data having the original distortion. More specifically, the motion vector output from the motion detection unit A 203 is a motion vector in the image data having no distortion, and the motion vector output from the vector correction unit 204 is a motion vector in the image data having the distortion. Therefore, the vector correction unit 204 acquires the aberration characteristic information from the aberration characteristic information storage unit 202, and inversely corrects the distortion.

Because the motion detection unit B 205 detects the motion vector without using the reduced image data, the motion detection unit B 205 detects the motion vector with higher precision than the motion detection unit A 203. The motion detection unit B 205 searches and detects the motion vector using the motion vector output from the vector correction unit 204, the input image data, and the reference image data. The motion detection unit B 205 sets the motion vector output from the vector correction unit 204 to a center of a search area, and searches the motion vector to detect the motion vector having higher precision in the search area. Thus, the detected motion vector is output to the motion compensation unit 113.

Figure 5A:
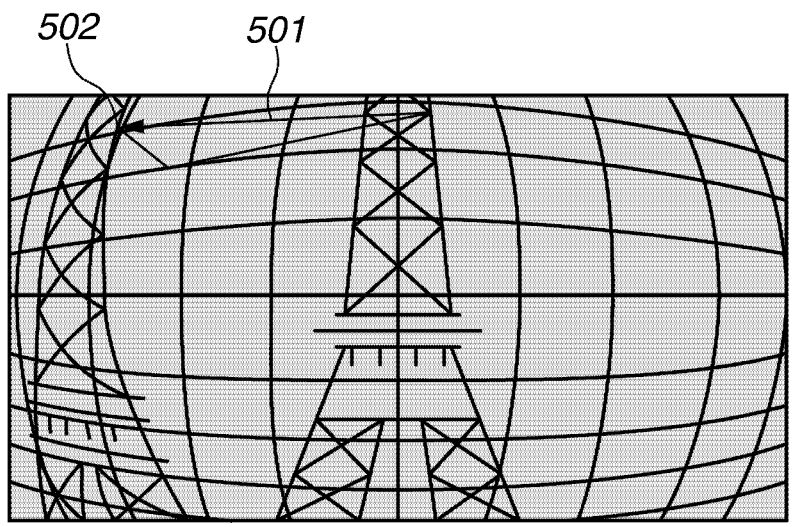
FIGS. 5A and 5B describe a vector correction unit and a motion detection unit.
Figure 5B:
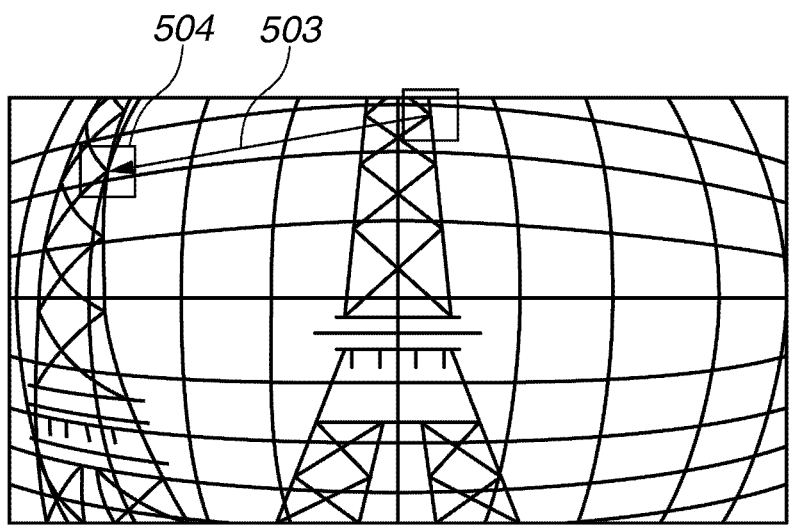

Here, the vector correction unit 204 and the motion detection unit B 205 will be described in more detail using FIGS. 5A-B. A motion vector 501 of FIG. 5A is a motion vector before correction by the vector correction unit 204. A motion vector 502 of FIG. 5A is a motion vector having distortion inversely corrected in the vector correction unit 204. Thus, the motion vector 501 detected from the image data having the corrected distortion is corrected to be the motion vector 502 in the image data having the original distortion. A motion vector 503 of FIG. 5B is a motion vector having the distortion inversely corrected in the vector correction unit 204 as well as the motion vector 502 of FIG. 5A. A search area 504 of FIG. 5B is set with the motion vector 503 as a center. The motion detection unit B 205 searches a macro block similar to a macro block to be encoded, in the search area 504, and searches and detects the motion vector.

Thus, according to the exemplary embodiment, the search area can be appropriately set when the motion vector is detected, which can improve the detection efficiency of the motion vector.

Next, a second exemplary embodiment of the present invention will be described. FIG. 6 illustrates a constitution of an imaging device according to the second exemplary embodiment of the present invention. In particular, FIG. 6 illustrates components related to encoding processing.

As illustrated in FIG. 6, an imaging device according to the exemplary embodiment includes a lens unit 601, an imaging unit 602, an intra prediction unit 603, an adder 604, an orthogonal transformation unit 605, a quantization unit 606, an entropy encoding unit 607, an dequantization unit 608, an inverse orthogonal transformation unit 609, a deblocking filter 610, a frame memory 611, a motion detection unit 612, a motion compensation unit 613, a switch 614, and an aberration characteristic information storage unit 615, as the components related to the encoding processing.

The lens unit 601, the intra prediction unit 603, the adder 604, the orthogonal transformation unit 605, the quantization unit 606, the entropy encoding unit 607, the dequantization unit 608, the inverse orthogonal transformation unit 609, the deblocking filter 610, the frame memory 611, the motion compensation unit 613, and the switch 614 have the same constitutions as the lens unit 101, the intra prediction unit 103, the adder 104, the orthogonal transformation unit 105, the quantization unit 106, the entropy encoding unit 107, the dequantization unit 108, the inverse orthogonal transformation unit 109, the deblocking filter 110, the frame memory 111, the motion compensation unit 113, and the switch 114 are as in FIG. 1. To avoid redundancy of description, further descriptions thereof are omitted.

When a lens included in the lens unit 601 is a variable focal lens, distortion is changed according to a focal length. The aberration characteristic information storage unit 615 connected to the lens unit 601 previously tabulates and holds a rate of distortion of the lens according to a focal length of the lens. The lens unit 601 reads aberration characteristic information used for distortion correction from the aberration characteristic information storage unit 615 whenever the focal length of the lens is changed, and outputs the aberration characteristic information to the imaging unit 602.

The imaging unit 602 outputs the aberration characteristic information together with input image data to the motion detection unit 612. The motion detection unit 612 corrects the distortion of the input image data and reference image data using the input aberration characteristic information. The motion detection unit 612 calculates a roughly searched motion vector using the input image data and the reference image data having corrected distortion, and inversely corrects the distortion of the calculated motion vector to calculate the final motion vector.

Figure 7:
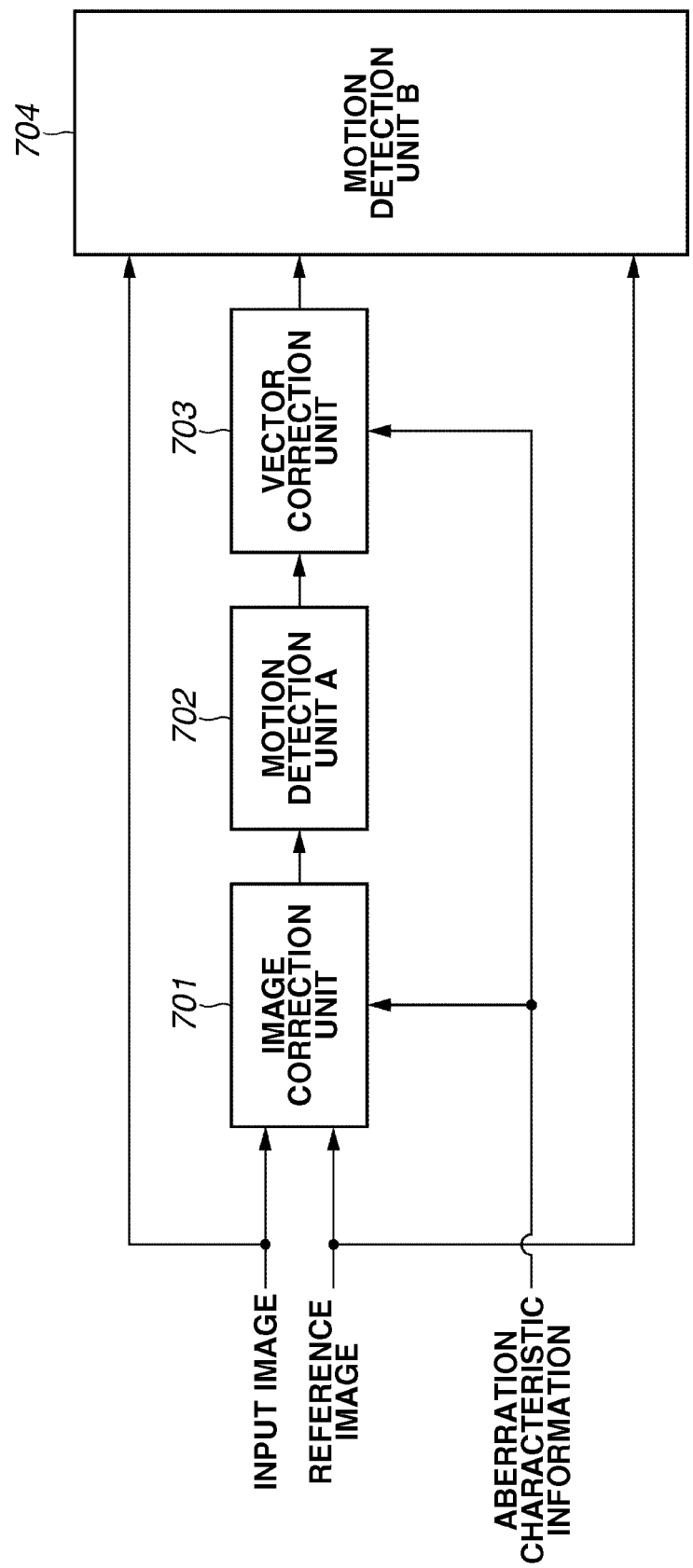
FIG. 7 illustrates a constitution of a motion detection unit in detail.

FIG. 7 illustrates a constitution of the motion detection unit 612 in detail. Hereinafter, the motion detection unit 612 will be described in detail with reference to FIG. 7. As illustrated in FIG. 7, the motion detection unit 612 includes an image correction unit 701, a motion detection unit A 702, a vector correction unit 703, and a motion detection unit B 704.

The input image data, the reference image data, and the aberration characteristic information are respectively input into the motion detection unit 612. The image correction unit 701, into which the input image data, the reference image data, and the aberration characteristic information are input, corrects the distortion of the input image data and the reference image data using the aberration characteristic information. Next, the image correction unit 701 reduces the input image data and the reference image data having the corrected distortion, and outputs the input image data and the reference image data to the motion detection unit A 702.

The motion detection unit A 702 roughly searches the motion vector, and outputs the detected motion vector to the vector correction unit 703. The vector correction unit 703 inversely corrects the motion vector using the input aberration characteristic information, and outputs the inversely corrected motion vector to the motion detection unit B 704.

The motion detection unit B 704 searches and detects the motion vector with higher precision than the motion detection unit A 702 using the motion vector, the input image data, and the reference image data output from the vector correction unit 703. The motion detection unit B 704 outputs the detected motion vector to the motion compensation unit 613.

Figure 8:
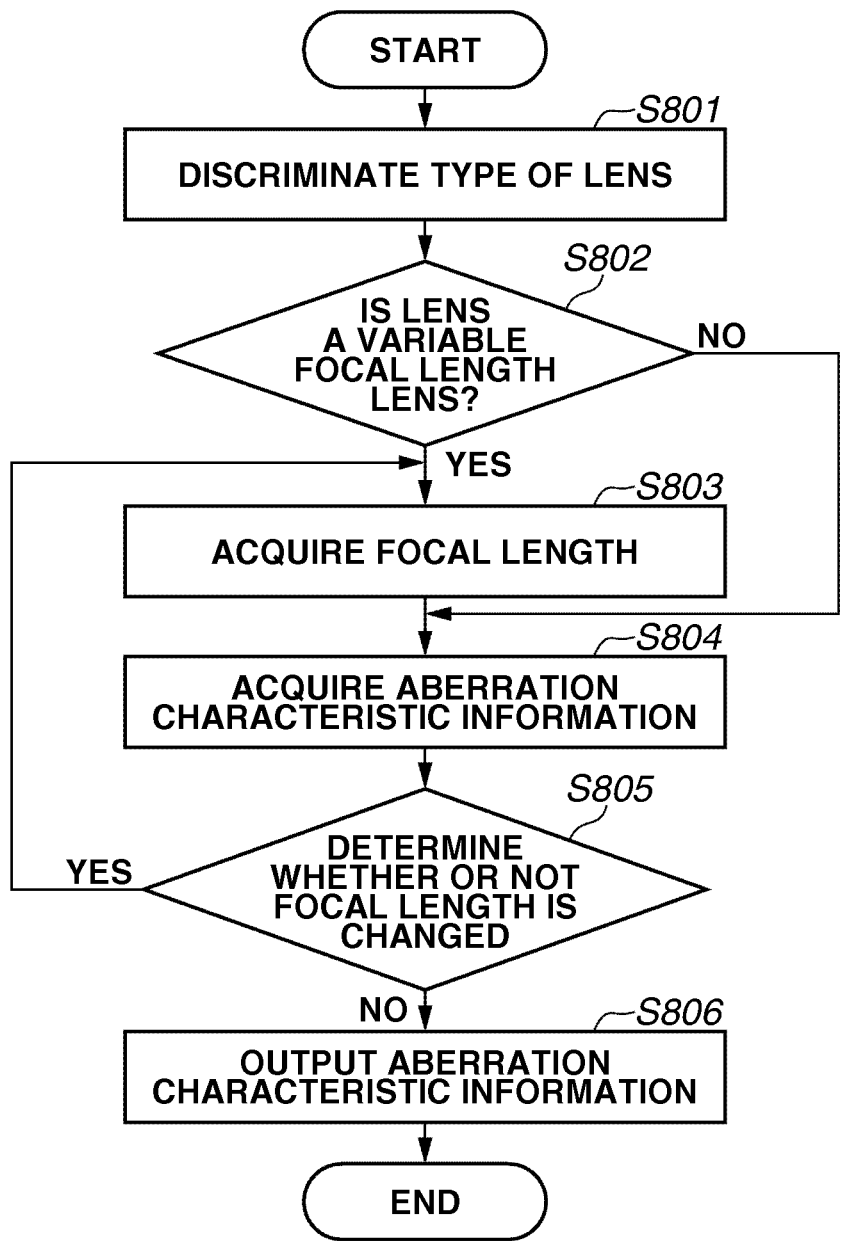
FIG. 8 is a flow chart illustrating an operation of a lens unit.

FIG. 8 is a flow chart illustrating an operation of the lens unit 601. Hereinafter, the operation of the lens unit 601 will be described with reference to FIG. 8.

In step S801, the lens unit 601 discriminates a type of an attached lens. Specifically, the lens unit 601 discriminates whether the lens is a variable focal length lens or a fixed focal length lens. Step S802 is control processing for branching according to whether the attached lens is the variable focal length lens or the fixed focal length lens. More specifically, when the lens is the variable focal length lens, the processing proceeds to step S803. On the other hand, when the lens is the fixed focal length lens, the processing skips step S803, and proceeds to step S804.

In step 803, the lens unit 601 acquires the current focal length. In step S804, the lens unit 601 acquires the aberration characteristic information from the aberration characteristic information storage unit 615. Because the aberration characteristic information is managed with the focal length as an index, the lens unit 601 acquires the aberration characteristic information corresponding to the focal length acquired in step S803 or the focal length of the fixed focal length lens, from the aberration characteristic information storage unit 615.

In step S805, the lens unit 601 determines whether the focal length is changed. When the variable focal length lens is attached, the lens unit 601 detects the change of the focal length caused by an operation such as zooming. When the focal length is changed, the processing returns to step S803. On the other hand, when the focal length is not changed, the processing proceeds to step S806. In step S806, the lens unit 601 outputs the aberration characteristic information used for distortion correction to the motion detection unit 612.

Because the aberration characteristic information is held in the lens unit 601 as described above, a hardware scale of a table holding the aberration characteristic information in a main body of the imaging device can be reduced. Because it is not necessary to update the aberration characteristic information even if a variety of lenses are newly marketed, a user's usability is also improved. According to the exemplary embodiment, the search area can be appropriately set when the motion vector is detected, which can improve the detection efficiency of the motion vector.

Figure 9:
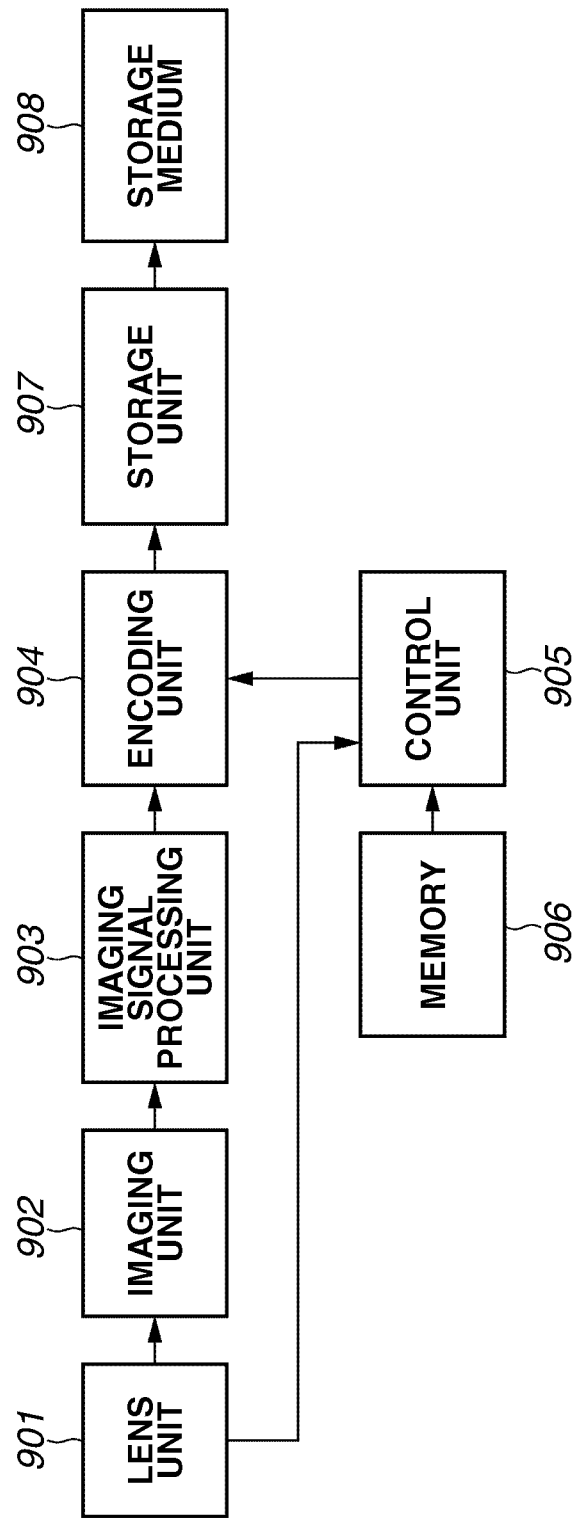
FIG. 9 illustrates a constitution of an imaging device according to a third exemplary embodiment of the present invention.

Hereinafter, a third exemplary embodiment of the present invention will be described. FIG. 9 illustrates a constitution of an imaging device according to the third exemplary embodiment of the present invention. Hereinafter, only different points from those of the first and second exemplary embodiments will be described.

In FIG. 9, a lens unit 901 collects light from a subject. The lens unit 901 has a detachable structure and it is assumed that various types of lenses such as a standard lens, a telephoto lens, and a fisheye lens are attached to the lens unit 901. The lens unit 901 is connected to a control unit 905, and outputs lens information indicating a lens type and the like in the lens unit 901 to the control unit 905. An imaging unit 902 includes an imaging element. The imaging unit 902 images the light collected by the lens unit 901, and outputs an image signal. An image signal processing unit 903 subjects the image signal output from the imaging unit 902 to A/D conversion, and subjects the image signal to processing such as color matrix conversion or gamma correction, to convert the image signal into a digitized image signal (input image data).

An encoding unit 904 is configured to encode the input image data to be output from the image signal processing unit 903 according to an encoding system such as an MPEG2 system or H.264. The encoding unit 904 divides the input image data into 16×16 pixel blocks referred to as macro blocks. The encoding unit 904 subjects the divided input image data to motion compensation prediction and orthogonal transformation. Furthermore, the encoding unit 904 subjects a transformation coefficient thereof to quantization processing, and subjects the transformation coefficient to entropy encoding, to compress and encode the input image data.

In the motion compensation prediction, a motion vector of the current input image data for each macro block relative to the image data obtained by decoding the input image data encoded just before, that is, the reference image data, is obtained by searching. Prediction image data is generated using the motion vector. A search area (hereinafter, referred to as a motion search area) of the motion vector in one macro block is generally the same in all the macro blocks on a screen. However, in the exemplary embodiment, the motion search area directed by the control unit 905 for each macro block is searched. More specifically, the control unit 905 reads motion search setting data from a memory 906, and sets the motion search area in the encoding unit 904. A storage unit 907 stores the input image data compression-encoded by the above-mentioned procedure in a storage medium 908. The motion search setting data is data for setting the motion search area for each macro block on the screen.

Figure 10:
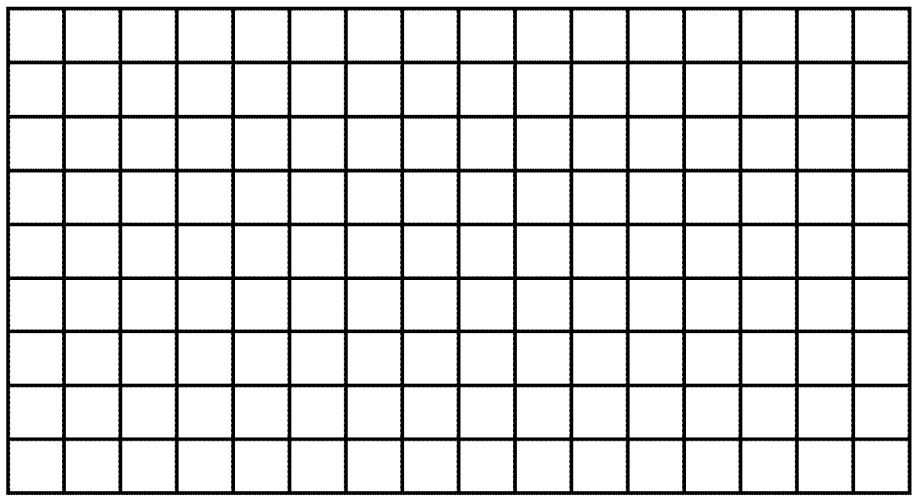
FIG. 10 is used for describing a lens distortion.
Figure 11:
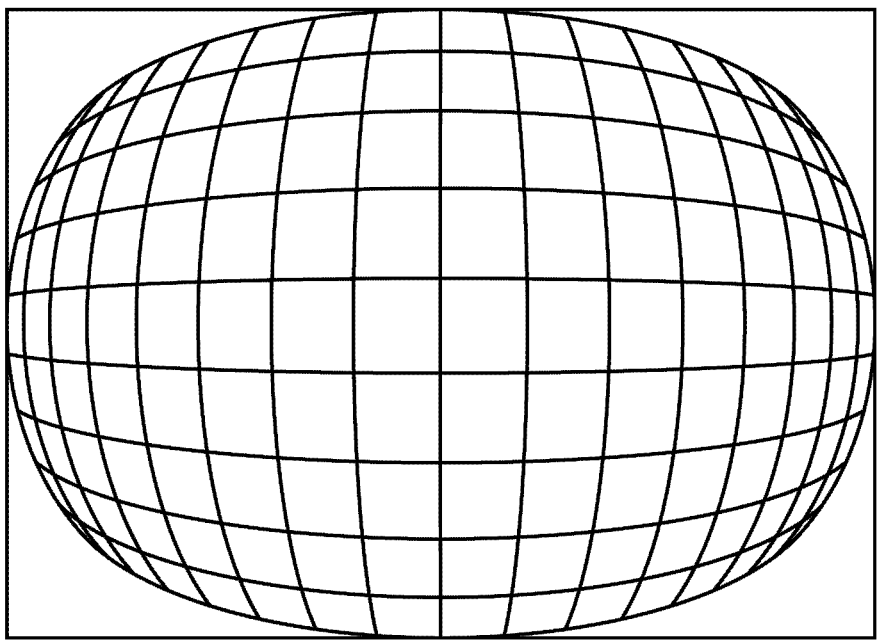
FIG. 11 describes a lens having distortion.

Next, an operation of the imaging device according to the exemplary embodiment will be described. A fisheye lens which is a super-wide-angle lens is attached to the imaging device as the lens unit 901 of FIG. 9. When a lattice-shaped drawing pattern as illustrated in FIG. 10 is captured, as illustrated in FIG. 11, image data in which a central portion of the screen is magnified and a surrounding portion thereof is reduced is output from the image signal processing unit 903 of FIG. 9. In other words, the attached fisheye lens has such an aberration characteristic. Because the central portion in which the image data is magnified by aberration has a large amount of motion when the image data captured by the lens having such aberration is encoded, the motion search area is set to be wider than usual. Even when the subject moves greatly, the motion vector can be suitably detected by setting the motion search area to be wider, and the precision of the prediction image data can be improved.

On the other hand, because the surrounding portion in which image data is reduced has a small amount of motion, the motion search area is set to be narrower than usual. False detection of searching can be prevented by narrowing the motion search area. When the motion search area is unnecessarily widened, a motion vector having no original motion of the subject is generated, which deteriorates image quality. Thus, the motion search area is widened or narrowed according to the aberration of the lens, and thereby the motion vector can be suitably searched.

The memory 906 previously stores motion search area data. This is data set according to a distortion rate of the lens, and is obtained by previously measuring the aberration characteristic of the lens and setting the motion search area for each macro block from a magnification/reduction rate for each area. The motion search area data stores setting data for each type or model number of lenses such as a fisheye lens or a standard lens.

Figure 12:
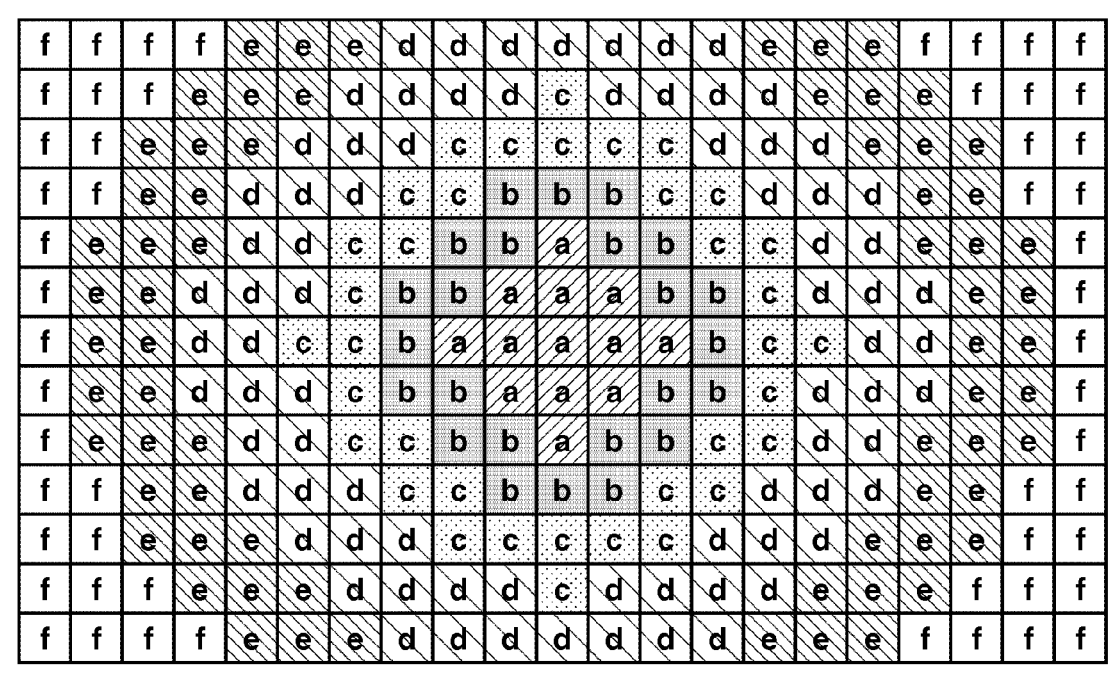

An example of the motion search area data in the fisheye lens will be described using FIG. 12. FIG. 12 illustrates an area of the image data to be encoded. Each small quadrangle corresponds to a macro block. As illustrated in FIG. 12, the memory 906 stores motion search area data (a) to (f) set according to a degree of distortion for each macro block. Actual values of the motion search area data (a) to (f) are a horizontal size X and a vertical size Y of a rectangle indicating the motion search area. For example, the values are illustrated in FIG. 13. In the example of FIG. 13, the motion search area data (a) has the widest motion search area. The motion search area is narrowed in order of the motion search area data (b), (c), (d), (e), and (f). In other words, the central portion in which the image data is magnified and the motion amount is increased has a value indicating a wide motion search area. The surrounding portion in which the image data is reduced and the motion amount is small has a value indicating a gradually narrowed motion search area. The whole screen has the same motion search area data in a lens other than the fisheye lens, for example, a standard lens having very few aberrations such as distortion.

The shape of the motion search area is the rectangle having the horizontal direction size X and the vertical direction size Y as described above. However, the present invention is not limited thereto. For examples, the shape may be a quadrangle other than the rectangle according to image distortions caused by various aberrations of the lens. The shape may be a circular shape or an elliptical shape. Examples thereof will be described below.

Figure 14:
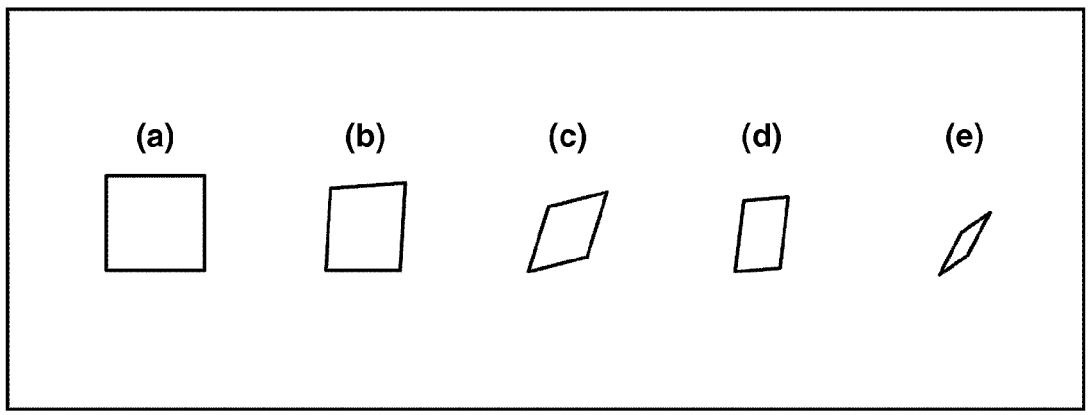
FIG. 14 illustrates an example of a shape of the motion search area.
Figure 15:
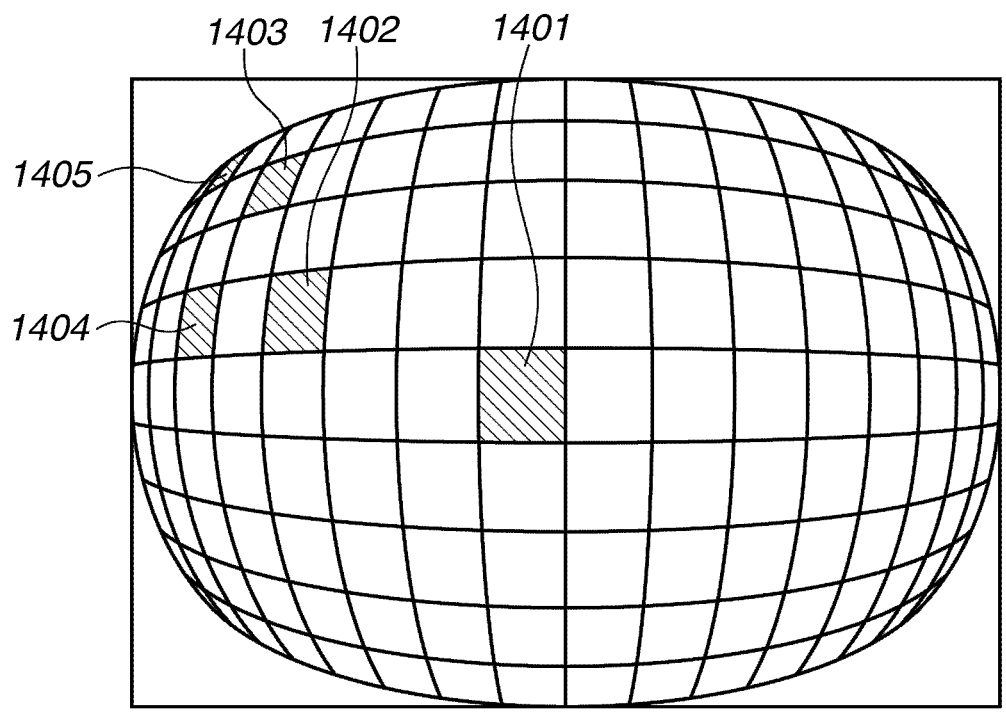
FIG. 15 illustrates image data obtained by photographing a grid pattern by a fisheye lens.

FIG. 15 illustrates image data obtained by capturing a grid pattern by the fisheye lens. For example, areas 1401 to 1405 illustrated by slanted lines are respectively defined as motion search areas of shapes (a) to (e) illustrated in FIG. 14, according to the deformed grid pattern. The motion search area has the same shape as the deformed shape, so that the motion search area having the same shape is set to the whole screen before being distorted by aberration.

The description will be returned to FIG. 9. The control unit 905 is connected to the lens unit 901, and acquires the lens information indicating the lens type from the lens unit 901. The control unit 905 specifies the lens type using the lens information, reads the corresponding motion search area data from the memory 906, and sets the motion search area to the encoding unit 904. Therefore, even when a lens having a different aberration characteristic is attached to the lens unit 901, the motion search area data according to the aberration characteristic of the lens can be set to the encoding unit 904. The encoding unit 904 searches the motion vector according to the set motion search area.

As described above, because the width of the motion search area can be set for each macro block according to the aberration of the lens in the third exemplary embodiment, the motion vector can be suitably searched, and high image quality encoding can be performed. In the exemplary embodiment, processing for setting the motion search area and processing for searching the motion vector in the set motion search area are executed by the motion detection units B 205 and 704 in FIGS. 2 and 7.

Figure 16:
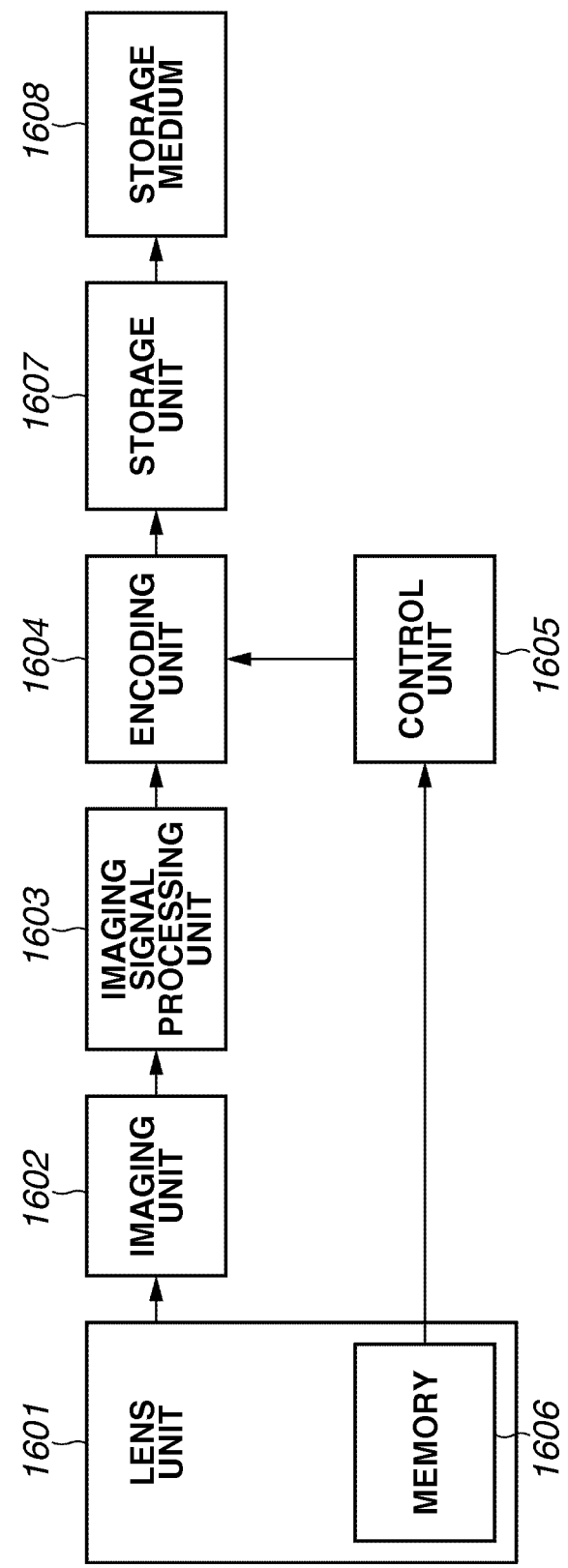
FIG. 16 illustrates a constitution of an imaging device according to a fourth exemplary embodiment of the present invention.

Next, a fourth exemplary embodiment of the present invention will be described. FIG. 16 illustrates a constitution of an imaging device according to the fourth exemplary embodiment of the present invention.

Because an imaging unit 1602, an image signal processing unit 1603, an encoding unit 1604, a storage unit 1607, and a storage medium 1608 in FIG. 16 have the same constitutions as the imaging unit 902, the image signal processing unit 903, the encoding unit 904, the storage unit 907, and the storage medium 908 in FIG. 9, the descriptions thereof are omitted.

A lens unit 1601 collects light from a subject. The lens unit 1601 has a detachable structure and it is assumed that various types of lenses such as a standard lens, a telephoto lens, and a fisheye lens are attached to the lens unit 1601. The lens unit 1601 includes a memory 1606. The memory 1606 corresponds to the memory 906 of FIG. 9. The memory 1606 stores motion search setting data set according to aberration of the lens unit 1601. The memory 906 of FIG. 9 stores the motion search setting data of the plurality of lens types . By contrast, the memory 1606 stores only the motion search setting data corresponding to the lens unit 1601.

A control unit 1605 is connected to the memory 1606 in the lens unit 1601. The control unit 1605 reads the motion search setting data, and sets a motion search area to the encoding unit 1604. The encoding unit 1604 searches a motion vector according to the set motion search area.

Because the lens stores the motion search setting data in the fourth exemplary embodiment, the motion vector can be searched by motion search setting according to the aberration of the lens even when the lens is provided after a main body of the imaging device is provided.

The processing of the above-mentioned embodiments of the present invention can be realized by reading a computer program for realizing functions of the processing from a memory of a system operating the imaging device of the present invention, and having a central processing unit (CPU) of the system or a micro-processor or micro-processors of the system execute the computer program. In this case, the present invention includes the program stored in the memory.

The above-mentioned program may only partially realize the functions described above. Furthermore, the program may be a so-called difference file (difference program) capable of realizing the functions described above in combination with a program already stored in a computer system.

Dedicated hardware may wholly or partially realize the functions of the processing of the above-mentioned embodiments of the present invention. Further, the processing may be performed by storing the program for realizing the functions of the processing in a computer-readable non-transitory storage medium, and causing the computer system to read the program stored in the storage medium, and to execute the program. The "computer system" includes OS or hardware such as peripheral equipment.

Here, the "computer-readable storage medium" includes a portable medium such as a flexible disk, a magnet-optical disk, a ROM, or a CD-ROM, and a storage device such as a hard disk included in the computer system. The "computer-readable storage medium" further includes a storage medium holding a program for a determined length of time such as a volatile memory (RAM) in a computer system serving as a server or a client when a program is transmitted through a network such as an internet, or a communication line such as a telephone line.

The above-mentioned program may be transmitted to other computer system through a transmission medium, or by a transmitted wave in the transmission medium, from the computer system including the storage device and the like storing the program. Here, the "transmission medium" transmitting the program means a medium having a function to transmit information such as a network (communication network), for example, internet, or a communication line (communication wire), for example, a telephone line.

A program product such as the computer-readable storage medium storing the above-mentioned program can be also applied to an exemplary embodiment of the present invention. The present invention includes the above-mentioned program, storage medium, transmission medium, and program product.

While the present invention has been described with reference to exemplary embodiments, it is to be understood that the invention is not limited to the disclosed exemplary embodiments . The scope of the following claims is to be accorded the broadest interpretation so as to encompass all modifications, equivalent structures, and functions.

This application claims priority from Japanese Patent Application No. 2011-018828 filed Jan. 31, 2011, which is hereby incorporated by reference herein in its entirety.

What is claimed is:

1. An imaging apparatus comprising:
   an imaging unit that generates image data corresponding to an image captured through a lens unit;
   a processing unit that processes the image data and reference image data using aberration characteristic information indicating an aberration characteristic of the lens unit;
   a first detecting unit that uses the processed image data and the processed reference image data to detect a first motion vector;
   a modification unit that modifies the detected first motion vector using the aberration characteristic information to generate a second motion vector different from the first motion vector;
   a second detecting unit that uses the second motion vector, the image data, and the reference image data to detect a third motion vector; and
   an encoding unit that encodes the image data using the detected third motion vector instead of the first motion vector and the second motion vector.

2. The imaging apparatus according to claim 1, wherein the aberration characteristic information is determined by information obtained from the lens unit.

3. The imaging apparatus according to claim 1, wherein the aberration characteristic information is determined by information obtained from the lens unit, and the information obtained from the lens unit includes information relating to a type of lens.

4. The imaging apparatus according to claim 1, wherein the aberration characteristic information is determined by information obtained from the lens unit, and the information obtained from the lens unit includes information relating to a focal length.

5. The imaging apparatus according to claim 1, further comprising a storage unit that stores the aberration characteristic information.

6. The imaging apparatus according to claim 1, wherein the lens unit includes a variable focal lens.

7. The imaging apparatus according to claim 1, wherein the aberration characteristic information is obtained from the lens unit.

8. The imaging apparatus according to claim 1, wherein the lens unit includes a fixed focal lens.

9. The imaging apparatus according to claim 1, wherein the lens unit includes one of a telephoto lens and a fisheye lens.

10. A method comprising:
    causing an imaging unit to generate image data corresponding to an image captured through a lens unit;
    processing the image data and reference image data using aberration characteristic information indicating an aberration characteristic of the lens unit;
    using the processed image data and the processed reference image data to detect a first motion vector;
    modifying the detected first motion vector using the aberration characteristic information to generate a second motion vector different from the first motion vector;
    using the second motion vector, the image data, and the reference image data to detect a third motion vector; and
    encoding the image data using the detected third motion vector instead of the first motion vector and the second motion vector.

11. The method according to claim 10, wherein the aberration characteristic information is determined by information obtained from the lens unit.

12. The method according to claim 10, wherein the aberration characteristic information is determined by information obtained from the lens unit, and the information obtained from the lens unit includes information relating to a type of lens.

13. The method according to claim 10, wherein the aberration characteristic information is determined by information obtained from the lens unit, and the information obtained from the lens unit includes information relating to a focal length.

14. The method according to claim 10, further comprising obtaining the aberration characteristic information from a storage unit in an imaging apparatus.

15. The method according to claim 10, wherein the lens unit includes a variable focal lens.

16. The method according to claim 10, wherein the aberration characteristic information is obtained from the lens unit.

17. The method according to claim 10, wherein the lens unit includes a fixed focal lens.

18. The method according to claim 10, wherein the lens unit includes one of a telephoto lens and a fisheye lens.

19. A non-transitory computer-readable storage medium that stores a program for causing a computer to execute a method, the method comprising:
    causing an imaging unit to generate image data corresponding to an image captured through a lens unit;
    processing the image data and reference image data using aberration characteristic information indicating an aberration characteristic of the lens unit;
    using the processed image data and the processed reference image data to detect a first motion vector;
    modifying the detected first motion vector using the aberration characteristic information to generate a second motion vector different from the first motion vector;
    using the second motion vector, the image data, and the reference image data to detect a third motion vector; and
    encoding the image data using the detected third motion vector instead of the first motion vector and the second motion vector.

* * * * *